March 8, 1966 R. E. REUSSER ETAL 3,239,306
SELENIUM RECOVERY FROM URANIUM LEACH LIQUOR
Filed July 26, 1962

INVENTORS.
ROBERT E. REUSSER
JAMES L. HART, DECEASED
BY DARALL G. HAWK, SPECIAL ADMINISTRATOR

ATTORNEYS

United States Patent Office 3,239,306
Patented Mar. 8, 1966

3,239,306
SELENIUM RECOVERY FROM URANIUM
LEACH LIQUOR
Robert E. Reusser, Bartlesville, Okla., and James L. Hart, deceased, late of Bartlesville, Okla., by Darall G. Hawk, special administrator, Bartlesville, Okla., assignors to Phillips Petroleum Company, a corporation of Delaware
Filed July 26, 1962, Ser. No. 212,745
6 Claims. (Cl. 23—14.5)

This invention relates to a method for removing selenium from leach liquor in the carbonate leaching of uranium ores. In another aspect, it relates to the recovery of elemental selenium from uranium containing materials.

Many of the ores which are now being treated by the carbonate leach process contain selenium compounds in varying amounts with some of this selenium being dissolved from the ore, during the leaching step, along with uranium values. Subsequently, the uranium values are most commonly recovered from the pregnant leach liquor by a precipitation step which comprises raising the pH of the liquor to a level where sodium uranates become insoluble, or other reducing agents are employed to reduce the uranium values to an insoluble tetravalent form. After separation of the precipitated uranium compounds the barren leaching solution, still containing selenates, is recarbonated to lower the carbonate content of forming bicarbonates and is recycled to the grinding step for use in preparing additional ore slurry. As the selenium compounds do not precipitate out along with the uranates, there results an undesirable pyramiding of selenium compounds in the leaching circuit, which will simultaneously increase the concentration of soluble selenium compounds being sent to disposal in the tailings pond along with the inert solids.

To control soluble selenium compounds build up in the carbonate leaching process, one alternative would be to regularly withdraw a portion of the leaching solution which is being recycled, and pass this stream to a selected waste disposal area. Another more useful alternative is to remove the selenium values in the form of relatively pure elemental selenium which can be purified for many electrical uses.

We have discovered that by converting the selenium compounds to elemental selenium, rather than permitting them to pass to waste disposal in soluble form, a safe and profitable method of resolving the selenium build up problem in the carbonate leaching of uranium ores is achieved.

According to the process of this invention, selenium and uranium are recovered from carbonate leach liquors by a process which comprises: treating pregnant carbonate leach liquor with a precipitating agent for the selenium, treating the resulting mixture with a precipitating agent for the uranium values, filtering out the mixture of precipitated selenium and uranium compound and treating the precipitate for separation of the two materials contained therein. In one separation method, the precipitated selenium and yellow cake are roasted at an elevated temperature to oxidize the selenium and vaporize the selenium dioxide leaving the yellow cake behind. The vaporized selenium dioxide is condensed and recovered as a high purity product.

In an alternate method, the precipitated yellow cake and selenium are treated with a source of sodium ion, such as barren carbonate leach liquor, and the resulting mixture is roasted at an elevated temperature. The selenium present is converted to sodium selenite and the vanadium present is converted to sodium vanadate. Quenching of the hot roasted yellow cake with water effects the dissolution of the selenium and vanadium compounds, but does not dissolve the insoluble uranium. The resulting solution, containing both dissolved vanadium and selenium values is then solvent extracted with a quaternary amine-hydrocarbon mixture to remove vanadium values, while the remaining selenium can be recovered by acidification and reduction with a suitable reducing agent, such as $SO_2$ or $NH_2OH \cdot HCl$.

Accordingly, it is an object of this invention to provide an economical method for the removal of selenium from leach liquor in the carbonate leaching of uranium ores. It is a further object to remove the selenium values in the form of relatively-pure selenium dioxide to remove the selenium for electrical applications. It is yet another object of this invention to coprecipitate selenium and yellow cake and subsequently separate the two materials present in this precipitate. Other objects, as well as aspects and advantages inherent in this method of selenium removal will become apparent upon studying the accompanying disclosure and drawing.

Figure 1:
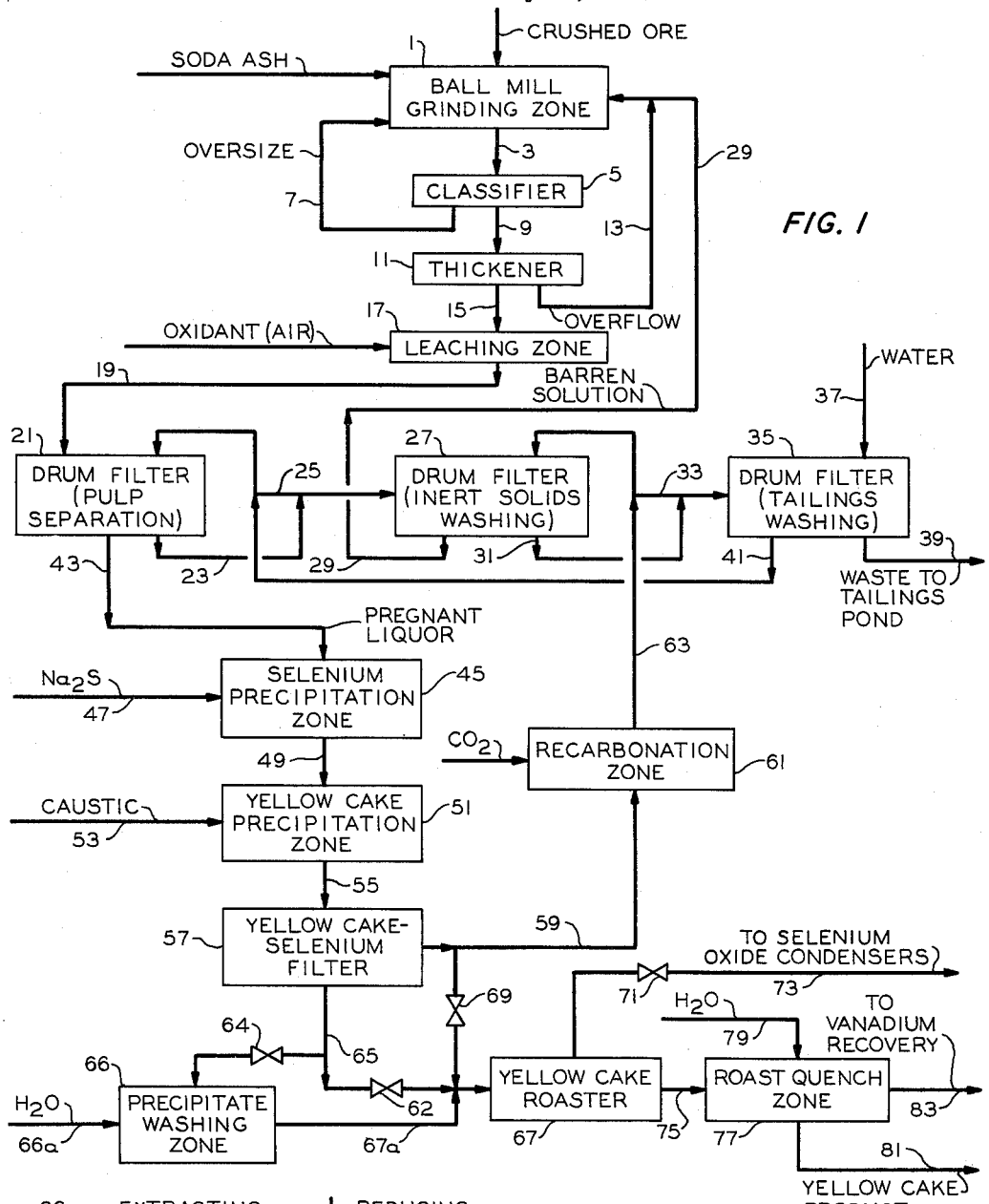
FIGURE 1 is a process diagram depicting the carbonate leach process for the recovery of uranium for the concurrent recovery of uranium, selenium and vanadium values from their ores.

Referring now to the drawing and to FIGURE 1 in particular, in which like parts have been designated by like reference numerals, and beginning at the top of the diagram, crushed uranium-bearing ore and soda ash are introduced to the ball mill grinding zone 1 wherein the ore is ground to a fine condition in the presence of water, sodium carbonate (soda ash) and sodium bicarbonate (in the barren solution recycle). An ore slurry leaves the ball mill and passes through line 3 to classifier 5, wherein oversized particles are returned to ball mill 1 via conduit 7, and the remaining fine ore slurry passes through line 9 to thickener 11. From the thickener, overflow is returned by conduit 13 to the grinding zone, while the thickened slurry passes through conduit 15 to leaching zone 17 wherein the oxidation and dissolution of the uranium and certain other elements of the ore such as selenium and vanadium takes place. The slurry is contacted with oxygen by passing air into the leaching zone, and is maintained at a predetermined temperature in the neighborhood of 100° C. for a period of time generally ranging from 50 to 75 hours so as to cause the uranium values to go into solution as the sodium uranyl tricarbonate complex. The resulting solution, containing the dissolved uranium values, is generally termed a pregnant liquor.

The pregnant liquor and pulp slurry leave oxidation zone 17 through conduit 19 and enter vacuum drum filter 21 wherein the pulp and the pregnant liquor are separated. The pulp, principally composed of inert solids, passes through conduits 23 and 25 to a second vacuum drum filter 27 wherein the inert solids are washed with part of a recycle, recarbonated barren solution. The filtrate from this filter passes through conduit 29 back to the ball mill grinding zone 1. The solids (tailings) from filter 27 pass via conduits 31 and 33 to a third drum filter 35. The tailings are washed in filter 35, this time using fresh water introduced through conduit 37. The washed tailings are finally passed through conduit 39 to a tailings pond for disposal. The filtrate from filter 35 is passed through conduit 41, part being used as feed to the spray of filter 21, and the remainder being used to slurry the pulp in conduit 25.

The pregnant liquor filtrate from filter 21 passes through conduit 43 to a selenium precipitation zone 45. In this zone, the soluble selenate compounds are converted to elemental selenium by the introduction of a treating agent, preferably sodium sulfide. This agent is introduced through line 47. The resulting slurry of elemental selenium in pregnant liquor then passes through conduit 49 to yellow cake precipitation zone 51. Caustic soda is introduced to this zone via line 53 to raise the pH above 11.5 and to generally provide an excess of NaOH amounting to from 4 to 10 grams per liter. This causes the yellow cake, or insoluble sodium diuranate ($Na_2U_2O_7$), to precipitate.

It is also within the scope of this process to combine zones 45 and 51 and to add the selenium precipitation agent and the caustic to the same zone. The two separate zones were shown to simplify the discussion set forth herein. The resulting slurry of precipitated selenium and precipitated sodium diuranate (yellow cake) in barren liquor then passes via conduit 55 to the yellow cake-selenium filter 57. In this filter, the barren liquor is separated from the precipitated solids, the barren liquor being drawn off through conduit 59 and passed to recarbonation zone 61. In zone 61, the barren liquor is recarbonated with flue gas, or similar source of $CO_2$ before passing via conduits 63 and 33 for recycle to filters 27 and 35. The recycled recarbonated liquor is divided, with approximately half being fed through conduit 63 to filter 27, the remainder passing through conduit 33 wherein it is combined with the tailings in conduit 31 and is then passed to tailings filter 35.

The separated yellow cake and selenium precipitate is withdrawn from filter 57 through line 65 to yellow cake roaster 67. In one embodiment, valves 69 and 62 are closed and valves 71 and 64 are open. The selenium yellow cake passes through valve 64 to zone 66, where sodium ion is removed by water washing, water entering via line 66a. The washed precipitate then passes via line 67a to roaster 67. In roaster 67, the selenium yellow cake precipitate is roasted at approximately 1500° F. for 1 to 3 hours, thus vaporizing the selenium present, in the form of the oxide. The vaporized selenium oxide then passes through open valve 71 and line 73 to selenium oxide condensers (not shown). The roasted yellow cake then leaves roaster 67 through line 75 to roast quench zone 77. In this zone, water is introduced via conduit 79 and contacts the hot yellow cake in zone 77. The vanadium present in the yellow cake is thus leached out and pure sodium diurante is withdrawn from zone 77 through line 81. The roast quench liquor containing dissolved vanadium values is withdrawn through conduit 83 to vanadium recovery (not shown).

In an alternate method of operation, valves 62 and 69 are open, and valves 64 and 71 are closed. A finite amount of barren liquor is mixed with the yellow cake-selenium precipitate entering yellow cake roaster 67. The addition of barren liquor to the stream provides excess sodium ion over and above that already present as occluded barren liquor on the solids from filter 57. This amount of sodium ion is sufficient to effect the conversion of elemental selenium to sodium selenite during subsequent roasting, thus preventing the vaporization of selenium from the yellow cake roaster. When the mixture leaving the roaster 67 to quench zone 77 is contacted with water, the yellow cake will again be unaffected by the water, but both the selenium and vanadium values will be dissolved and will be removed via line 83.

Figure 2:
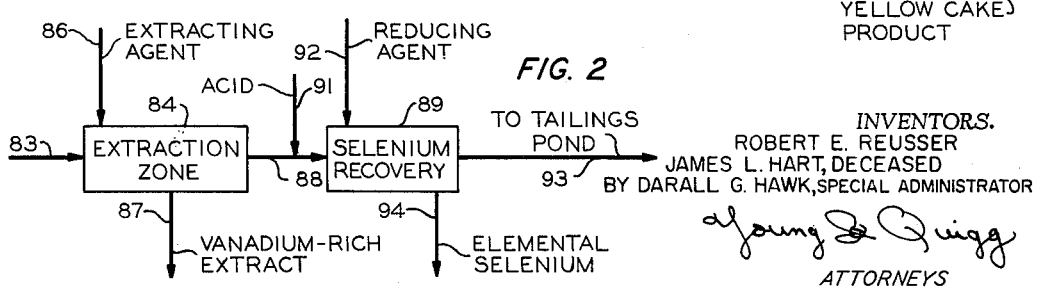
FIGURE 2 is a process diagram depicting another embodiment of the same process wherein the same values are recovered from their ores.

As shown in FIGURE 2, the vanadium can be separated from the selenium by extraction in zone 84 with a quaternary amine-hydrocarbon mixture introduced via line 86 which will not pick up the selenium values. Vanadium-rich extract is withdrawn via line 87. The resulting solution passes via conduit 88 to selenium recovery zone 89. Selenium can then be recovered from the solution by acidification, such as with HCl, introduced via line 91, and reduction with a suitable reducing agent, such as $SO_2$, or $NH_2OH \cdot HCl$, introducted via line 92. The remaining liquor passes to disposal via line 93, and elemental selenium is withdrawn via line 94.

In the selenium precipitation step wherein a treating agent is added to convert the soluble selenium compound to elemental selenium, we can employ such agents as sodium sulfide, hydrogen sulfide, sodium thio sulfate, sodium sulfite, sodium hydrosulfide, and the like. Other alkali metal sulfides, thio sulfates, sulfites and hydrosulfites can be employed, but these materials are not as economical as the sodium compounds. Primarily, for purposes of economy, we prefer hydrogen sulfide and sodium sulfide, with the latter being the more preferred. Whatever agent is used, it is necessary to employ an excess of the precipitating agent, and the agent should be present in an amount ranging from 0.1 to 4.0 mols of agent per mole of dissolved selenium present in the leach liquor. It is preferred to use from 0.25 to 2.0 moles per mole on the same basis. The selenium precipitation step will be carried out at any temperature between 20 and 200° C. Temperatures above 100° C. can be employed but are usually not desirable since pressure vessels are required to avoid evaporation of the solution.

The precipitation of yellow cake by the addition of caustic is a well known commercial process, and will not be described in detail herein. Briefly, the process consists of adding an excess of caustic to the pregnant liquor stream, thus breaking the sodium uranyl tricarbonate complex and causing precipitation of sodium diuranate, a hexavalent uranium compound.

The conditions at which the yellow cake will be roasted, either to effect the formation and vaporization of selenium dioxide or to cause reaction of sodium ion with selenium to form sodium selenite, will generally be from 1200 to 1600° F. for a period of time in the range of about 10 minutes to 3 hours. If sodium ion is added in the form of barren liquor, as described above, the amount of sodium ion present will generally range from 5 to 15 weight percent based on dry sodium diuranate. When added sodium ion is employed, the roasting time will generally be less than 30 minutes, as opposed to the longer times when vaporization of selenium is required.

The following specific examples are intended to illustrate the advantages of this invention, but it is not intended that the invention be limited to the specific embodiments shown therein.

*Example 1*

A run was carried out in which selenium and sodium diuranate were coprecipitated from a carbonate leach liquor.

In this run, 800 ml. of pregnant uranium carbonate leach liquor from a commercial carbonate leach circuit which contained 0.642 gram per liter selenium was treated with 3.2 ml. of $Na_2S$ solution which contained 0.139 gram of $Na_2S$/ml. The resulting mixture was left to digest for 5 minutes, after which 54.5 ml. of 25 percent by weight aqueous NaOH solution was added. This amount of caustic was sufficient to raise the pH to 11.5 and to provide 10 g./l. excess NaOH. The resulting mixture was then agitated for 5 hours at 140° F., after which the precipitate was centrifuged off. Analysis of the barren liquor showed it to contain 0.489 gram per liter selenium, thus 23.82 percent of the selenium was precipitated with the yellow cake. The yellow cake analyzed 1.42 weight percent selenium.

A portion of the selenium-containing yellow cake, amounting to 1.002 grams, was heated to 1500° F. for 1.5 hours. The yellow cake lost 0.0815 gram or 9.12 weight percent. Analysis of the yellow cake remaining showed the selenium content to be 0.00 percent.

Another portion (1.00 gram) of the selenium-containing yellow cake was mixed with 2 ml. of barren liquor containing dissolved sodium carbonate. The barren liquor used contained 0.0015 gram of selenium, and the yellow cake contained 0.0142 gram of selenium. The resulting mixture was heated to 1300° F. for 30 minutes, cooled and water washed three times with 20 ml. of $H_2O$ each time. The selenium content of the washed yellow cake was 0.00 weight percent. Analysis of the filtrate showed it to contain 0.0157 gram of selenium, thus checking the material balance.

The data of Example I demonstrates the substantially complete separation of selenium from coprecipitated yellow cake by either embodiment of the present invention.

*Example II*

In still another run, 800 ml. of the pregnant liquor of Example I, also containing 0.642 gram per liter selenium, was heated to 160° F., and 3.2 ml. of $Na_2S$ solution containing 0.139 gram of $Na_2S$ per ml. was added. The selenium precipitate formed was a reddish color. This mixture was stirred for about 5 minutes at 160° F., then sufficient caustic was added as a 25 percent aqueous solution to raise the pH to 11.5 and provide 10 grams per liter excess NaOH. The resulting mixture was agitated for 5 hours, after which the solids were centrifuged off. The filtrate analyzed 0.524 gram per liter selenium, thus 18.38 percent of the selenium was precipitated.

The yellow cake (and selenium) was then mixed with 5.0 ml. of barren leach liquor containing dissolved $Na_2CO_3$, and the mixture was heated for 1 hour at 1300° F. The fused yellow cake was then washed four times with 20 ml. of water. The wash water was then treated with HCl and $NH_2OH \cdot HCl$ to precipitate the selenium present. The amount of selenium recovered was 0.0653 gram. The yellow cake then analyzed 0.00 percent selenium and 82.90 weight percent $U_3O_8$. These data indicate that selenium can be recovered from the quench liquor resulting from employing the method of the second embodiment.

The barren liquor remaining after the yellow cake and selenium precipitation step was then employed for further leaching of uranium ore. The barren liquor was recarbonated to obtain a leach liquor containing 10.00 grams per liter $NaHCO_3$ and 59.48 grams per liter $Na_2CO_3$. Five hundred grams of this liquor and 500 grams of an uranium-containing ore were mixed together and leached at 90° C. for 50 hours. The percent $U_3O_8$ extraction obtained was 95.42 percent. Treatment of 100 ml. of the pregnant leach liquor with 0.4 ml. of $Na_2S$ solution (1 ml.=0.139 gram $Na_2S$) resulted in the precipitation of 18 percent of the selenium present.

These data indicate a significant percentage of the selenium dissolved in the leach circuit can be precipitated on each pass.

The data of Example II indicate that the barren liquor can be recarbonated and reused to leach uranium values from their ores and still permit a substantial percentage of the selenium dissolved in the pregnant leach liquor to be precipitated.

As will be evident to those skilled in the art, the various modifications are possible within the scope of the disclosure, the drawing and the appended claims to the invention.

What is claimed is:

1. A process for recovering uranium and selenium values from an ore which comprises: oxidizing an aqueous slurry of comminuted uranium and selenium containing ore in the presence of a carbonate leaching solution in a leaching zone to form a pregnant liquor containing dissolved water soluble uranium compound and dissolved water soluble selenium compounds; separating undissolved solids; treating the dissolved values in said pregnant liquor with first and second agents substantially concurrently to convert said values to insoluble uranium and insoluble elemental selenium, said first agent being selected from the group consisting of sodium sulfide, hydrogen sulfide, sodium thiosulfate, sodium sulfite and sodium hydrosulfite, and said second agent comprising sodium hydroxide; separating the resulting barren solution from the precipitated values; and treating said precipitated values to separate selenium and uranium from one another.

2. The process according to claim 1 in which said barren solution is recycled to the leaching circuit.

3. A process for recovering uranium and selenium values from an ore which comprises oxidizing an aqueous slurry of comminuted uranium and selenium containing ore in the presence of sodium carbonate and sodium bicarbonate in a leaching zone to form a pregnant liquor containing dissolved water soluble hexavalent uranyl compound and dissolved water soluble selenium compounds; separating undissolved solids, treating the dissolved values in said pregnant liquor with first and second agents, said first agent being selected from the group consisting of sodium sulfide, hydrogen sulfide, sodium thiosulfate, sodium sulfite and sodium hydrosulfite, and said second agent comprising sodium hydroxide, substantially concurrently to convert said values to insoluble uranium and insoluble selenium compounds; separating the resulting barren solution from the precipitated values; and treating said precipitated values to separate selenium and uranium from one another.

4. A process for recovering uranium and selenium values from an ore which comprises oxidizing an aqueous slurry of comminuted uranium and selenium containing ore in the presence of a carbonate leaching solution in a leaching zone to form a pregnant liquor containing dissolved water soluble uranium compound and dissolved water soluble selenium compounds; separating undissolved solids; treating the dissolved values in said pregnant liquor with first and second agents, said first agent being selected from the group consisting of sodium sulfide, hydrogen sulfide, sodium thiosulfate, sodium sulfite and sodium hydrosulfite, and said second agent comprising sodium hydroxide, substantially concurrently to convert said values to insoluble uranium and insoluble selenium compounds; separating the resulting barren solution from the precipitated values; and heating said precipitated values to separate selenium values in the form of selenium dioxide, leaving the insoluble uranium values.

5. The process according to claim 4 in which said precipitated values are passed to a washing zone wherein the occluded sodium ions are removed therefrom prior to passing said values to said heating step.

6. A process for recovering uranium, vanadium and selenium values from an ore which comprises oxidizing an aqueous slurry of comminuted uranium, vanadium and selenium containing ore in the presence of a carbonate leaching solution in a leaching zone to form a pregnant liquor containing dissolved water soluble uranium compounds, dissolved with water soluble vanadium compounds and dissolved water soluble selenium compounds; separating undissolved solids; treating the dissolved values in said pregnant liquor with first and second agents, said first agent being selected from the group consisting of sodium sulfide, hydrogen sulfide, sodium thiosulfate, sodium sulfite and sodium hydrosulfite, and said second agent comprising sodium hydroxide, substantially concurrently to convert said values to insoluble uranium, insoluble vanadium and insoluble selenium compounds; separating the resulting barren solution from the precipitated values; treating said precipitated values with an aqueous solution containing sodium ions present in an amount ranging from 5 to 15 weight percent based on the precipitated uranium values; heating the resulting slurry at elevated temperatures to convert the selenium values to sodium selenite and vanadium values to sodium vanadate; quenching the resulting heated product with water to effect the dissolution of the selenium and vanadium compounds while leaving the uranium values in insoluble form; removing the vanadium values from the first resulting solution by contacting thereof with a solvent comprising a quaternary amine-hydrocarbon mixture; and treating the second resulting solution by acidification and reduction with $SO_2$ to reduce said selenium values to insoluble form.

References Cited by the Examiner

UNITED STATES PATENTS 2,949,339   8/1960   Marvin _____ 23—14.5

OTHER REFERENCES

Faimni et al.: Anal. Chim. Acta., 22, 437–8, May 1960.

CARL D. QUARFORTH, *Primary Examiner.*

REUBEN EPSTEIN, *Examiner.*